United States Patent
Zakhor (10) Patent No.: US 9,953,430 B1
(45) Date of Patent: Apr. 24, 2018

(54) METHODS FOR DETECTING LUMINARY FIXTURES

(71) Applicant: Indoor Reality, Berkeley, CA (US)

(72) Inventor: Avideh Zakhor, Berkeley, CA (US)

(73) Assignee: INDOOR REALITY INC., Berkeley, CA (US)

( * ) Notice: Subject to any disclaimer, the term of this patent is extended or adjusted under 35 U.S.C. 154(b) by 78 days.

(21) Appl. No.: 14/927,239

(22) Filed: Oct. 29, 2015

(51) Int. Cl.
*G06T 7/20* (2017.01)
*H04N 7/18* (2006.01)
*G06K 9/46* (2006.01)
*G06T 5/20* (2006.01)

(52) U.S. Cl.
CPC .............. *G06T 7/20* (2013.01); *G06K 9/4604* (2013.01); *G06T 5/20* (2013.01); *H04N 7/183* (2013.01); *G06T 2207/10024* (2013.01); *G06T 2207/10028* (2013.01)

(58) Field of Classification Search
CPC ... G06T 7/20; G06T 5/20; G06T 2207/30108; G06T 7/0004; G06T 2207/10024; G06T 2207/20221; G06K 9/4604; G06K 9/00664; G06K 9/00791; H04N 7/183
See application file for complete search history.

(56) References Cited

U.S. PATENT DOCUMENTS

| | | | | |
|---|---|---|---|---|
| 7,733,351 B1* | 6/2010 | Sinnard | ................... | G06Q 10/06 345/582 |
| 8,885,909 B2* | 11/2014 | Takagi | ................. | A61B 6/4233 382/132 |
| 2006/0061566 A1* | 3/2006 | Verma | ..................... | G06T 17/20 345/419 |
| 2009/0262974 A1* | 10/2009 | Lithopoulos | .............. | G06T 7/73 382/100 |
| 2011/0194755 A1* | 8/2011 | Jeong | ................... | G05D 1/0246 382/153 |

(Continued)

OTHER PUBLICATIONS

Cheng et al. Texture mapping 3D planar models of indoor environments with noisy camenra poses SPIC Electronic Imaging confernece (2013).*

(Continued)

*Primary Examiner* — Jingge Wu
(74) *Attorney, Agent, or Firm* — Kali-Law Group, P.C.

(57) ABSTRACT

Methods for detecting a number of luminary fixtures in an indoor environment using an electronic image capture device and electronic computing device are presented, the methods including: capturing a ceiling scan of the indoor environment with at least the electronic image capture device; analyzing a synthetic ceiling image corresponding with the ceiling scan using the electronic computing device to identify a number of luminary candidates; and converting the number of luminary candidates to define the number of luminary fixtures. In some embodiments, the capturing the ceiling scan further includes: moving the electronic image capture device through the indoor environment; capturing the indoor environment; generating a point cloud of the indoor environment; colorizing the point cloud; extracting the colored point cloud of a ceiling; dividing the extracted point cloud into a number of rooms; and generating the synthetic ceiling image for each of the number of rooms.

16 Claims, 6 Drawing Sheets

(56) References Cited

U.S. PATENT DOCUMENTS

| | | | | |
|---|---|---|---|---|
| 2012/0250978 | A1* | 10/2012 | Taylor | G06T 7/292 |
| | | | | 382/154 |
| 2013/0100280 | A1* | 4/2013 | Sun | G01J 1/0403 |
| | | | | 348/135 |
| 2014/0055978 | A1* | 2/2014 | Gantz | A45C 11/00 |
| | | | | 362/8 |
| 2016/0071294 | A1* | 3/2016 | Park | G06T 7/97 |
| | | | | 382/190 |
| 2016/0266594 | A1* | 9/2016 | Kauffman | G05B 15/02 |
| 2016/0343140 | A1* | 11/2016 | Ciprari | G06T 7/60 |

OTHER PUBLICATIONS

Avideh Zakhor, Eric Turner, Floor Plan Generation and Room Labeling of Indoor Environments fromLaser Range Data, Department of Electrical Engendering and Computer Sciences, p. 12, University of California, Berkeley, CA.

Avideh Zakhor, Nicholas Corso, Indoor Localization Algorithms for an Ambulatory Human Operated 3D Mobile Mapping System, Remote Sensing, Dec. 3, 2013, p. 36, Berkeley, CA.

Eric Turner, Avideh Zakhor, Multistory Floor Plan Generation and Room Labeling of Building Interiors from Laser Range Data, p. 16, Department of Electrical Engineering and Computer Sciences, University of California, Berkeley, CA 94720.

George Chen, John Kua, Stephen Shum, Nikhil Naikal, Matthew Carlberg, Avideh Zakhor, Indoor Localization Algorithms for a Human-Operated Backpack System, Video and Image Processing Lab, University of California, Berkeley, p. 8.

Timothy Liu, Matthew Carlberg, George Chen, Jacky Chen, John Kua, Avideh Zakhor, Indoor Localization and Visualization Using a Human-Operated Backpack System, 2010 International Conference on Indoor Positioning and Indoor Navigation (IPIN), Sep. 15-17, Zurich, Switzerland, p. 10.

* cited by examiner

METHODS FOR DETECTING LUMINARY FIXTURES

CROSS-REFERENCE TO RELATED APPLICATIONS

The present invention is related to the following application, which is incorporated herein by reference: U.S. patent application Ser. No. 14/855,742, filed on Sep. 16, 2015.

BACKGROUND

Building energy efficiency is important since energy consumption inside buildings is a major part of total energy consumption in most modern societies and as such contributes heavily to carbon emissions. A large percentage of electricity consumption in today's commercial buildings is due to lighting. Lighting is the lowest hanging fruit during energy audit of buildings. For example, an energy audit usually involves counting the number and type of luminaries installed in a building. From the audit, consumption due to the installed luminaries may be estimated. The energy consumption of the installed luminaries may then be compared with the energy consumption of potential luminary replacements. This would provide the property owners an estimate of achievable electricity savings by upgrading the lighting in their building. A typical energy audit involving lighting consists of a human with a clipboard and pen to walk inside building and write down the kind of luminary in each room of a building. This can be laborious, tiring, error prone and inaccurate.

As methods for detecting luminary fixtures are provided herein.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Methods for detecting a number of luminary fixtures in an indoor environment using an electronic image capture device and electronic computing device are presented, the methods including: capturing a ceiling scan of the indoor environment with at least the electronic image capture device; analyzing a synthetic ceiling image corresponding with the ceiling scan using the electronic computing device to identify a number of luminary candidates; and converting the number of luminary candidates to define the number of luminary fixtures. In some embodiments, the capturing the ceiling scan further includes: moving the electronic image capture device through the indoor environment; capturing the indoor environment; generating a point cloud of the indoor environment; colorizing the point cloud; extracting the colored point cloud of a ceiling; dividing the extracted point cloud into a number of rooms; and generating the synthetic ceiling image for each of the number of rooms. In some embodiments, analyzing the synthetic ceiling image further includes: generating a binary image of the synthetic ceiling image; detecting a number of blobs; and identifying the number of luminary candidates corresponding with the number of blobs. In some embodiments, the converting the number of luminary candidates to define the number of luminary fixtures further includes: measuring an area associated with a selection of the number of luminary candidates, where the area is measured in pixel units; converting the area into a metric area using a number of distance units provided by the point cloud; estimating a conversion factor between the metric area and a power consumption utilizing a selection of the number of luminary candidates, where the conversion factor is determined from a number of luminaries having a known area and a known power consumption using a linear least square method; and determining a power consumption for each of the number of luminary fixtures by multiplying the conversion factor with the area of each of the number of luminary candidates. In some embodiments, methods further include: capturing the ceiling scan with a lux meter; and determining a lumen density for each of the number of rooms from the synthetic ceiling image.

In other embodiments, computing device program products for detecting a number of luminary fixtures in an indoor environment using an electronic image capture device and electronic computing device are presented, the computing device program products including: a non-transitory computer readable medium; first programmatic instructions for capturing a ceiling scan of the indoor environment with at least the electronic image capture device; second programmatic instructions for analyzing a synthetic ceiling image corresponding with the ceiling scan using the electronic computing device to identify a number of luminary candidates; and third programmatic instructions for converting the number of luminary candidates to define the number of luminary fixtures, where the programmatic instructions are stored on the non-transitory computer readable medium. In some embodiments, the first programmatic instructions for capturing the ceiling scan further includes: fourth programmatic instructions for moving the electronic image capture device through the indoor environment; fifth programmatic instructions for capturing the indoor environment; sixth programmatic instructions for generating a point cloud of the indoor environment; seventh programmatic instructions for colorizing the point cloud; eighth programmatic instructions for extracting the colored point cloud of a ceiling; ninth programmatic instructions for dividing the extracted point cloud into a number of rooms; and tenth programmatic instructions for generating the synthetic ceiling image for each of the number of rooms. In some embodiments, the second programmatic instructions for analyzing the synthetic ceiling image further includes: twelfth programmatic instructions for generating a binary image of the synthetic ceiling image; thirteenth programmatic instructions for detecting a number of blobs; and fourteenth programmatic instructions for identifying the number of luminary candidates corresponding with the number of blobs. In some embodiments, the third programmatic instructions for converting the number of luminary candidates to define the number of luminary fixtures further includes: seventeenth programmatic instructions for measuring an area associated with a selection of the number of luminary candidates, where the area is measured in pixel units; eighteenth programmatic instructions for converting the area into a metric area using a number of distance units provided by the point cloud; nineteenth programmatic instructions for estimating a conversion factor between the metric area and a power consumption utilizing a selection of the number of luminary candidates, where the conversion factor is determined from a number of luminaries having a known area and a known power consumption using a linear least square method; and twentieth programmatic instructions for determining a power consumption for each of the number of luminary fixtures by multiplying the conversion factor with the area of each of the number of luminary candidates.

In other embodiments systems of computer hardware for detecting a number of luminary fixtures in an indoor environment, the systems including: an electronic image capture device, where the electronic image capture device is configured to capture a ceiling scan of the indoor environment; and an electronic computing device, where the electronic computing device is configured to analyze a synthetic ceiling image corresponding with the ceiling scan to identify a number of luminary candidates, and where the electronic computing device is configured to convert the number of luminary candidates to define the number of luminary fixtures.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION

As will be appreciated by one skilled in the art, the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals /per se/, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

As disclosed herein, methods include a human operator carrying an acquisition device (either a backpack or a handheld) may walk inside buildings to automatically collect data which may then be processed to estimate the number of ceiling luminary fixtures in each room, to determine their location in the room, to estimate their power consumption, and to determine the type of luminary in each room traversed by the operator. The acquisition device must consist of at least one image capture device (i.e. a camera) pointed at the ceiling, and a number of range finders which can be used to generate 3D point cloud of a ceiling of the building. To generate a 3D point cloud of a ceiling requires accurate localization algorithms for the acquisition device.

Figure 1:
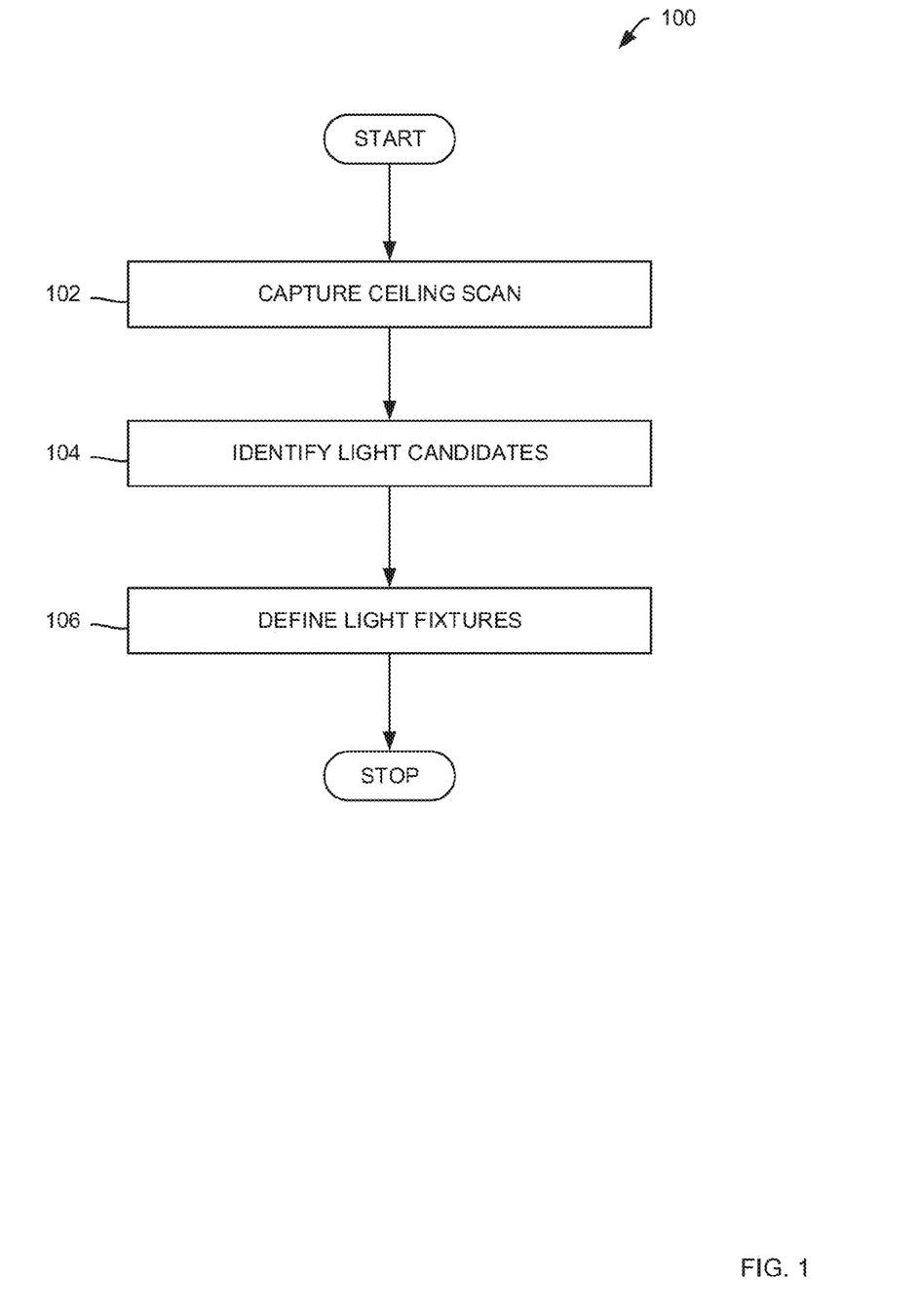
FIG. 1 is an illustrative flowchart of an overview of methods for detecting luminary fixtures in accordance with embodiments of the present invention.

FIG. 1 is an illustrative flowchart 100 of an overview of methods for detecting luminary fixtures in accordance with embodiments of the present invention. As illustrated, at a first step 102 the methods captures a ceiling scan of an indoor environment. Indoor environments may include any number of rooms, floors, and luminary fixtures without limitation. In addition, indoor environments may be finished construction or in process construction without limitation. In general, localization methods may be utilized in combination with image capture and analysis to determine the number and type of luminary fixtures present in each room in the indoor environment. In embodiments, a three dimensional (3D) scan may be made with a number of electronic image capture devices and range scanners that may be deployed through the indoor environment in a number of manners including a walk through utilizing a backpack or a handheld, or a drive through using a robotic device. An end result of a step 102 is a synthetic ceiling image of the colorized point cloud corresponding to the ceiling of each room that may be further analyzed using methods provided herein. Step 102 will be discussed in further detail below for FIG. 2.

At a next step 104, the method analyzes synthetic ceiling images corresponding with the ceiling scan to identify any luminary candidates. In general, image data may be qualitatively defined in embodiments utilizing a number of noise and data reduction techniques. Step 104 will be discussed in further detail below for FIG. 3. At a next step 106, the method defines any luminary fixtures. In general, luminary candidates detected at a step 104 may be quantitatively defined in embodiments utilizing known characteristics of luminary fixtures and a conversion factor. The method then ends. Step 106 will be discussed in further detail below for FIG. 4.

Figure 2:
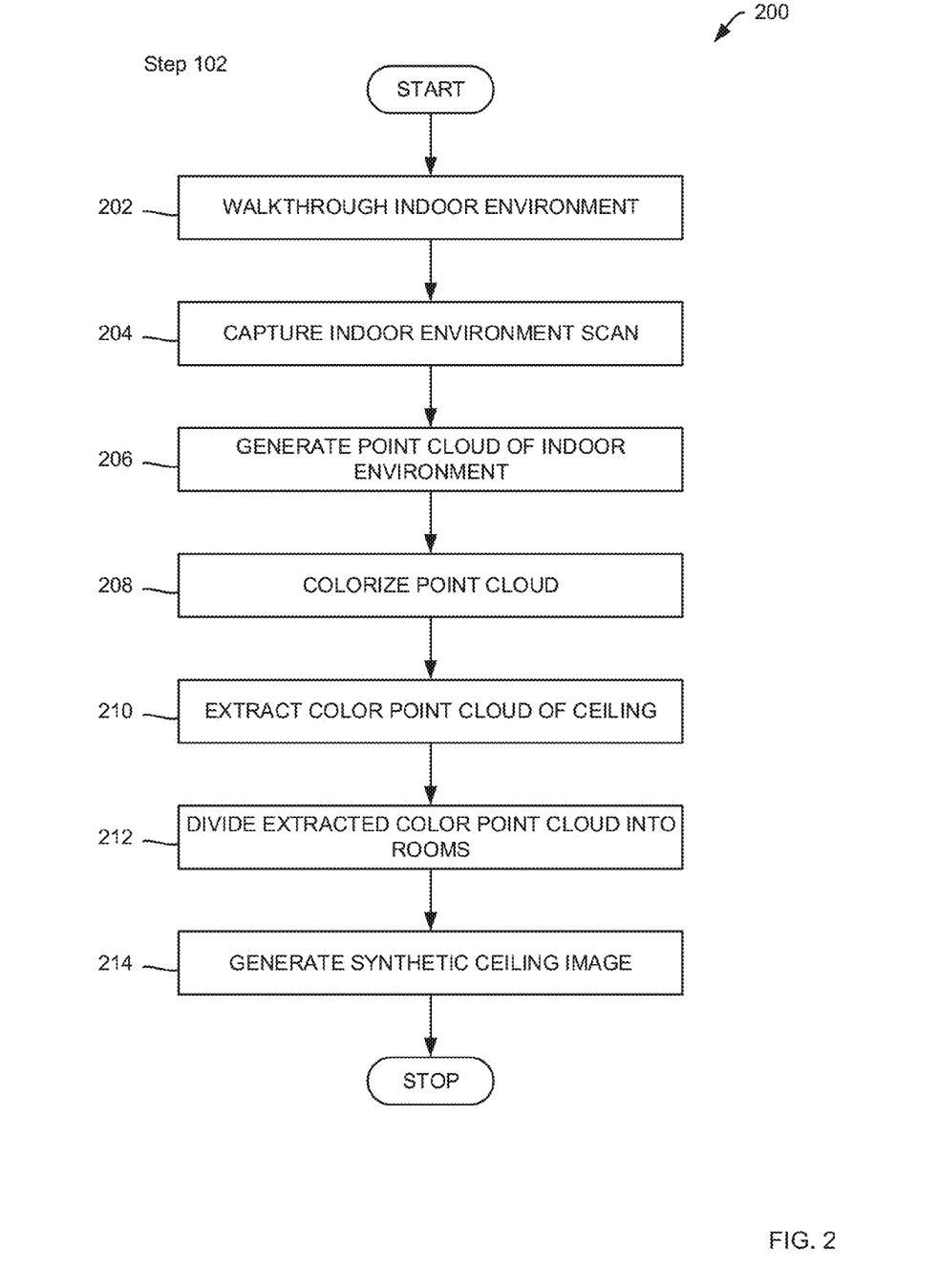
FIG. 2 is an illustrative flowchart of methods for capturing a ceiling scan in accordance with embodiments of the present invention.

FIG. 2 is an illustrative flowchart 200 of methods for capturing a ceiling scan in accordance with embodiments of the present invention. In particular, flowchart 200 is an illustrative flowchart of a step 102 of FIG. 1. As illustrated, at as step 202, the method walks through the indoor environment. That is, the method moves one or more electronic image capture devices through an indoor environment. In embodiments, electronic image capture devices may be moved through the environment by any means such as, for example: by a human utilizing a backpack device configured with an electronic image capture device; by an operator controlled robotic device configured with an electronic image capture device; by a semi-autonomous robotic device configured with an electronic image capture device; or by an autonomous robotic device configured with an electronic image capture device without limitation. In all cases, at least one electronic image capture device may be directed upwardly to capture a ceiling. At a step 204, the method captures the indoor environment. That is, the one or more electronic image capture devices and range scanners may capture the indoor environment at a capture rate sufficient to provide enough detail to resolve features of the indoor environment. In addition, the one or more electronic image capture devices and range scanners may capture the indoor environment with a field of view sufficient to provide a colorized 3D model of the indoor environment.

At a next step 206, the method generates a point cloud of the indoor environment. A point cloud, as utilized herein, is a set of data points in a three-dimensional coordinate system.

Figure 6:
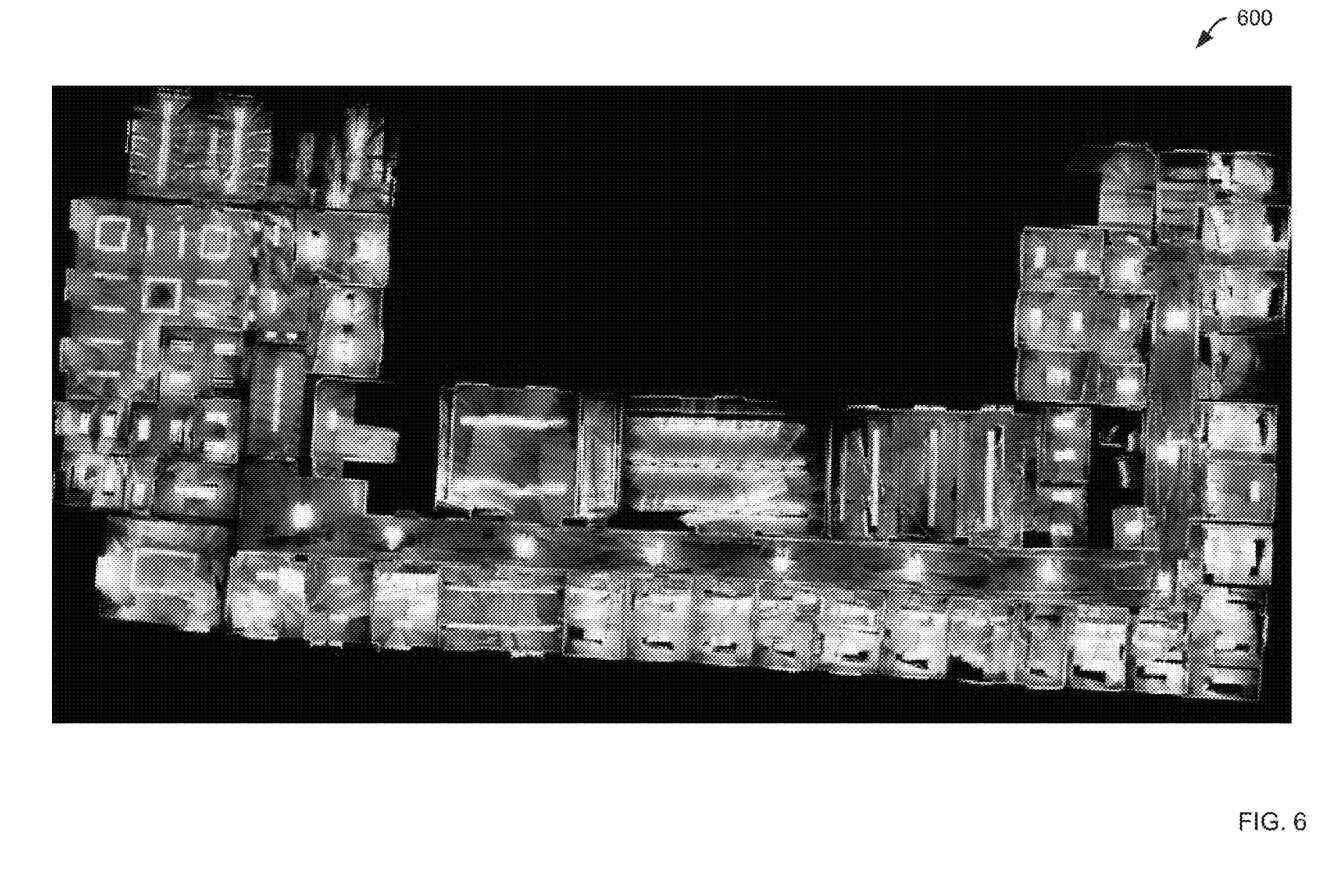
FIG. 6 is an illustrative representation of a colorized point cloud of a ceiling in accordance with embodiments of the present invention.

These points are usually defined by X, Y, and Z coordinates, and are intended to represent the external surfaces of objects so as to provide the geometry of the environment. At a next step 208, the method colorizes the point cloud. Colorizing may proceed by mapping captured images to the point cloud to provide a colored texture to the point cloud. Color texturing provides a more realistic representation of the indoor environment. Returning to FIG. 2, at a next step 210, the methods may extract the colored point cloud of the ceiling. As may be appreciated, point clouds may generate a large and dense data set. It may be desirable to extract the portion of the point cloud that contains items or objects of interest. As such, the method extracts the portion of the point cloud corresponding with the ceiling. Turning briefly to FIG. 6, FIG. 6 is an illustrative representation 600 of a colorized point cloud of a ceiling in accordance with embodiments of the present invention, which is provided for clarity in understanding embodiments provided herein. At a next step 212, the method divides the extracted point cloud into rooms. Rooms may be determined by analyzing vertical surfaces present in the point cloud. For example, continuous vertical surfaces may be assumed to be a wall that defines a room. At a next step 214, the method generates a synthetic ceiling image of all the rooms. At this point, a texture mapped model of the indoor environment ceiling by room has been generated. The method then ends.

Figure 5:
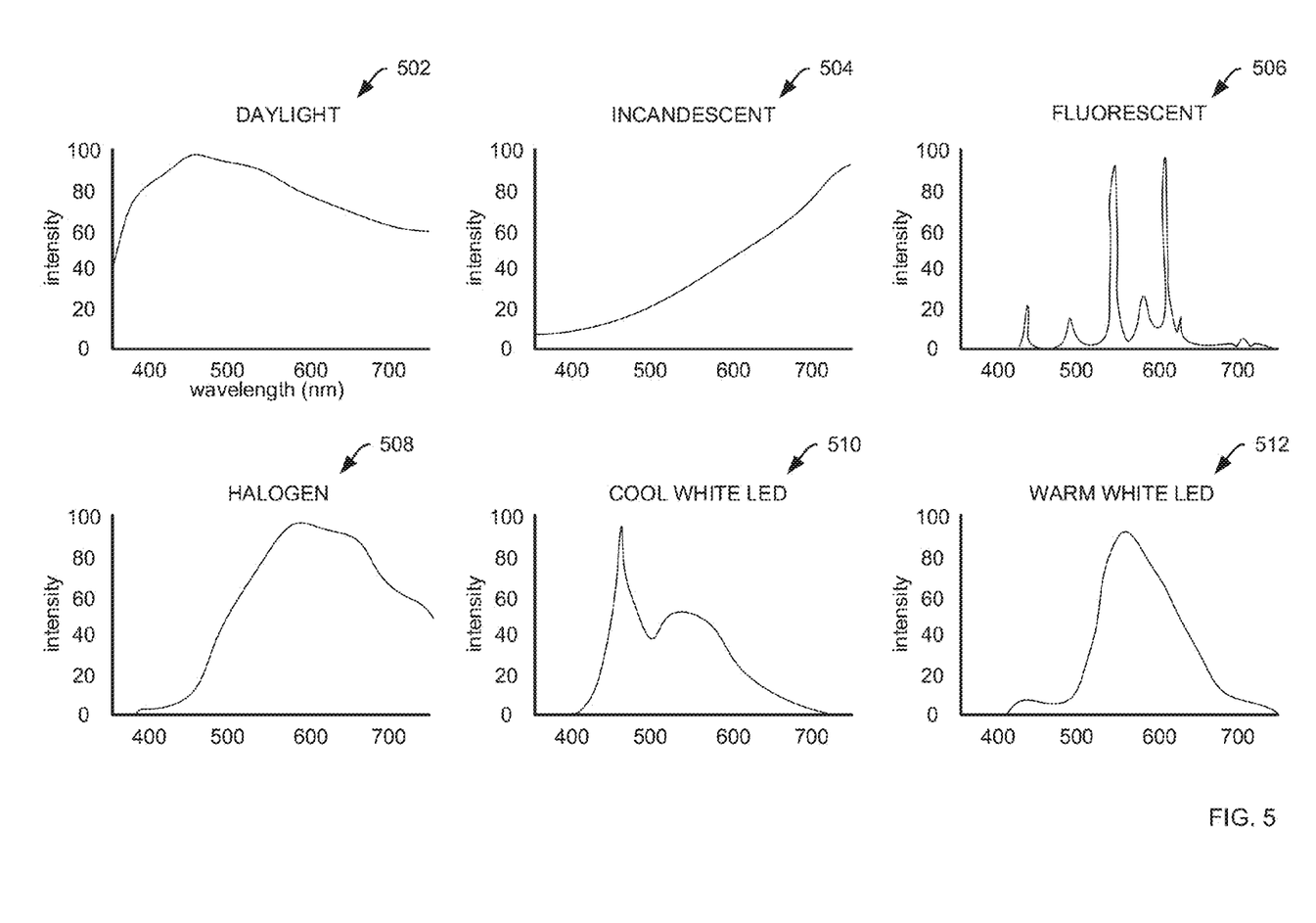
FIG. 5 is an illustrative representation of several types of luminary source spectra.

It may be appreciated that in some embodiments, additional scanning equipment may be utilized to provide additional data. For example, in one embodiments, methods may capture the ceiling scan with a lux meter and subsequently determine lumen density for each from the synthetic ceiling image. Utilizing methods herein lumen density is known as a function of each position in each room. Thus, for example, the center of the room may be brighter or darker than the sides. In another example, methods may capture the ceiling scan with a spectrometer and subsequently measure a spectrum of light emitted by the luminary fixtures for each of the rooms from the synthetic ceiling image. In embodiments, the spectrum of light may be associated with a luminary source such as: a florescent luminary source, an incandescent luminary source, an LED luminary source, a halogen luminary source, an artificial luminary source, and a natural luminary source. In one embodiment, by looking at the spectrum of the light in each room it may be determined whether that room has florescent, incandescent, or LED luminaries therein. Turning briefly to FIG. 5, which is an illustrative representation of several types of luminary source spectra., namely: daylight 502, incandescent 504, fluorescent 506, halogen 508, cool white LED 510, and warm white LED 512. To distinguish between three different luminary sources such as incandescent 504, fluorescent 506, and cool white LED 510, the following algorithm may be applied:

If there are no peaks and the spectrum is monotonically increasing then the luminary is incandescent;
If there are multiple narrow peaks then the luminary is fluorescent
If there are two peaks with the second one being "broad", then we have an LED luminary.

It may be appreciated that other algorithms for determining luminary sources may be employed in embodiments without limitation.

Figure 3:
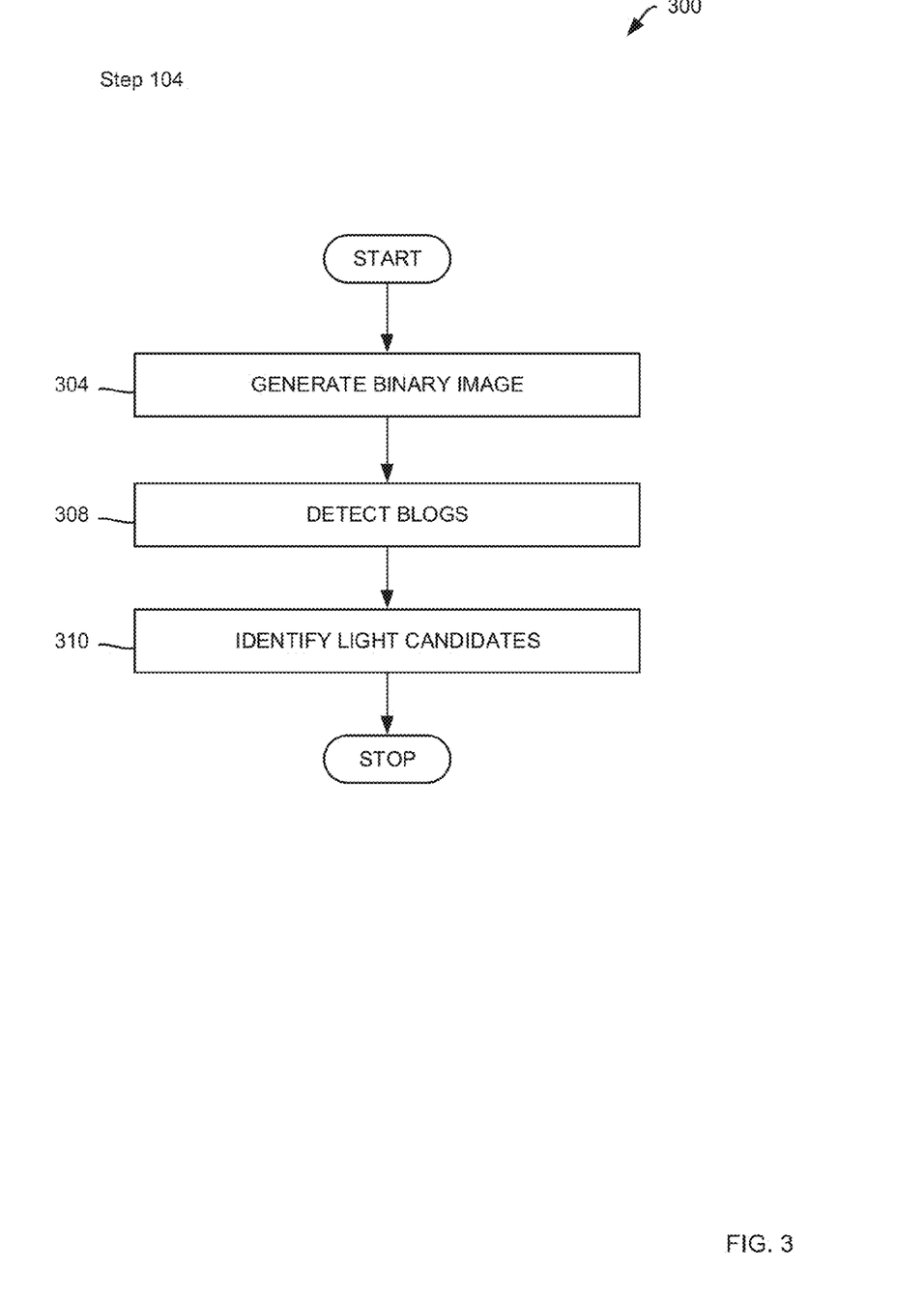
FIG. 3 is an illustrative flowchart of methods for detecting luminary candidates in accordance with embodiments of the present invention.

Turning to FIG. 3, FIG. 3 is an illustrative flowchart 300 of methods for detecting luminary candidates in accordance with embodiments of the present invention. In particular, flowchart 300 is an illustrative flowchart of a step 104 of FIG. 1. At a first step 304, the method generates a binary image of the synthetic ceiling image. In embodiments, methods may utilize a threshold filter to generate the binary image of the synthetic ceiling image. A binary image distinguishes "light" portions of the image from "dark" portions of the image—the light portion being a potential luminary fixture. At a next step 308, the method detects a plurality of blobs where connected white pixels are grouped together in a blob. In other words, the method applies an algorithm that connects light portions of the binary image in a meaningful way to identify any potent luminary candidates. Thus, at a step 310, the method identifies the luminary candidates corresponding with blobs. The method then ends.

Figure 4:
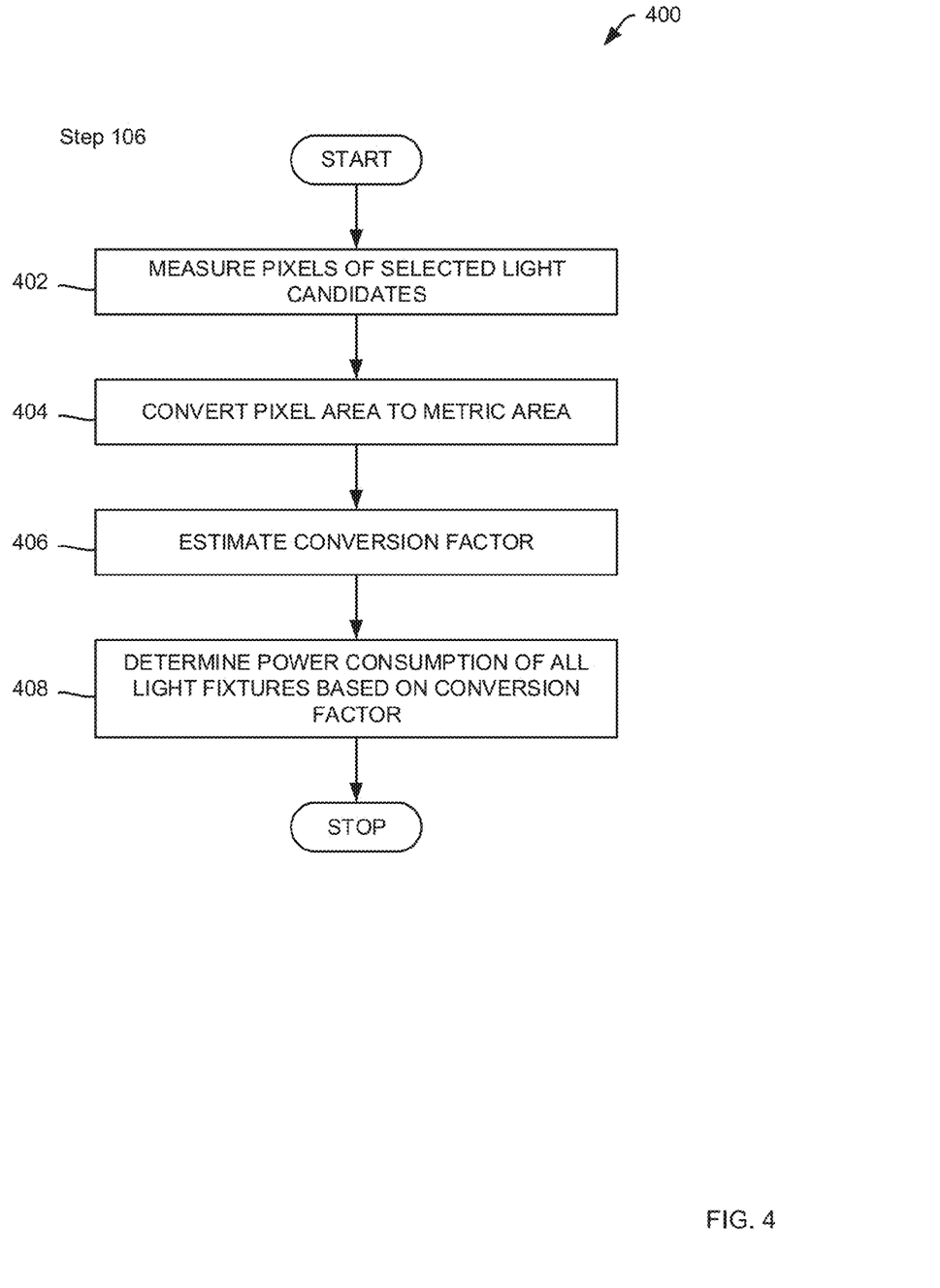
FIG. 4 is an illustrative flowchart of methods for defining luminary fixtures in accordance with embodiments of the present invention.

FIG. 4 is an illustrative flowchart 400 of methods for defining luminary fixtures in accordance with embodiments of the present invention. In particular, flowchart 400 is an illustrative flowchart of a step 106 of FIG. 1. At a first step 402, the method measures an area associated with a selection of luminary candidates, where in the area is measured in pixel units. As is well-known in the art, images consist of pixels. At step 310 the pixels in a region corresponding to luminary candidates have already been identified. By converting the pixels to an area, the area of the luminary candidate may be compared with known luminary sources. At a step 404, the method converts the pixel area into a metric area using distance units provided by the point cloud. Because pixels are points in a point cloud each pixel has a physical dimension corresponding to a metric area (e.g. each pixel is 1 cm×1 cm) and hence the area corresponding to luminary candidates may be measured.

At a next step 406, the method estimates a conversion factor between an area and a power consumption by using a selection of luminary candidates. In embodiments, the conversion factor may be determined from luminaries having a known area and a known power consumption using a linear least square method. By comparing known power values with observed area values, a correlation between the values may be achieved. This correlation is the conversion factor. At a step 408, the method determines power consumption of each of the luminary fixtures by applying the conversion factor to each of the luminary candidates. The method then ends.

Example Conversion Factor

The following represents an example of determining a conversion factor in accordance with embodiments provided herein:

Determining a conversion factor begins by selecting candidate luminary regions for which it is easy to estimate the actual power. For example, standard florescent luminaries that are 48 inches long, consume 28 watts, while those that are 24 inches long consume 14 watts. The following list depicts few standard T5 luminaries with different lengths and different power consumptions:

2 feet 14 Watts
3 feet 21 Watts
4 feet 28 Watts

Suppose that in a synthetic ceiling image, 48 inch long rectangular looking light blobs (as described in a step 308, FIG. 3) corresponding to luminary candidates are identified. In accordance with known values, 28 watts may be assigned to those light blobs. By repeating this process, a table of the luminary candidates for which we know the area and power may be generated. Below is an example of nine candidate light blobs for which the major axis of blob or length (majaxis), the minor axis of blob or width (minaxis), and the associated pixel values (areas) have been estimated:

majaxis=[74.07; 74.64; 73.34; 75.45; 76.43; 25.6; 25.93; 26.82; 26.97]

minaxis=[11.94; 11.41; 12.47; 12.23; 13.89; 12.83; 11.77; 11.92; 11.52]

areas=[1041; 1020; 1106; 1092; 1097; 361; 371; 378; 349]

As expected, the first five entries in each data set have similar sizes and therefore have similar areas. Likewise, the latter four entries in each data set have similar sizes and have similar areas. Furthermore the first five data entries correspond to a concatenation of a 48 inch and 24 inch luminary fixture (i.e. luminary fixture that is about 72 inches long total) and hence consumer a total of 28+14=42 watts, whereby the 28 watts corresponds to a 48 inch luminary and 14 watts corresponds to a 24 inch luminary. Similarly, the last four correspond to luminaries that are only 24 inches long and hence consume 14 watts. Therefore, it is assumed that the estimated power consumption of these luminaries are:

Estimated Watts=[42,42,42,42,42,14,14,14,14]

In solving a linear least square problem to find a proportionality constant between estimated watts and area, the conversion factor of 0.04 relating the area in pixels to power consumption of luminaries may be obtained. This conversion factor may then be applied to the areas of all luminary candidates found in a step 310 in order to estimate power consumption.

This example is provided for clarity in understanding embodiments disclosed herein and should not be construed as limiting with respect to the parameters disclosed.

While this invention has been described in terms of several embodiments, there are alterations, permutations, and equivalents, which fall within the scope of this invention. It should also be noted that there are many alternative ways of implementing the methods, computer program products, and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for detecting a plurality of luminary fixtures in an indoor environment using an electronic image capture device and electronic computing device, the method comprising:
   capturing a ceiling scan of the indoor environment with at least the electronic image capture device;
   analyzing a synthetic ceiling image of all rooms in the indoor environment corresponding with the ceiling scan using the electronic computing device to identify a plurality of luminary candidates, wherein the synthetic ceiling image represents a texture mapped model of a ceiling of the indoor environment by room; and
   converting the plurality of luminary candidates to define the plurality of luminary fixtures, wherein the converting the plurality of luminary candidates to define the plurality of luminary fixtures further comprises:
      measuring an area associated with a selection of the plurality of luminary candidates, wherein the area is measured in pixel units;
      converting the area into a metric area using a plurality of distance units provided by a point cloud;
      estimating a conversion factor between the metric area and a power consumption utilizing a selection of the plurality of luminary candidates, wherein the conversion factor is determined from a plurality of luminaries having a known area and a known power consumption using a linear least square method; and
      determining a power consumption for each of the plurality of luminary fixtures by multiplying the conversion factor with the area of each of the plurality of luminary candidates.

2. The method of claim 1, wherein the capturing the ceiling scan further comprises:
   moving the electronic image capture device through the indoor environment;
   capturing the indoor environment;
   generating a point cloud of the indoor environment;
   colorizing the point cloud;
   extracting the colored point cloud of a ceiling;
   dividing the extracted point cloud into a plurality of rooms; and
   generating the synthetic ceiling image for each of the plurality of rooms.

3. The method of claim 1, wherein analyzing the synthetic ceiling image further comprises:
   generating a binary image of the synthetic ceiling image;
   detecting a plurality of blobs wherein connected white pixels are grouped together in each of the plurality of blobs; and
   identifying the plurality of luminary candidates corresponding with the plurality of blobs.

4. The method of claim 3, further comprising utilizing a threshold filter to generate the binary image of the synthetic ceiling image.

5. The method of claim 3, further comprising utilizing a blob detection algorithm to detect the plurality of blobs, wherein the plurality of blobs correspond with the plurality of luminary candidates.

6. The method of claim 2, further comprises:
   capturing the ceiling scan with a lux meter; and
   determining a lumen density for each of the plurality of rooms from the synthetic ceiling image.

7. The method of claim 2, further comprises:
   capturing the ceiling scan with a spectrometer; and
   measuring a spectrum of light emitted by the plurality of luminary fixtures for each of the plurality of rooms from the synthetic ceiling image.

8. The method of claim 7, wherein the spectrum of light is associated with a luminary source selected from the group consisting of: a florescent luminary source, an incandescent luminary source, an LED luminary source, a halogen luminary source, an artificial luminary source, and a natural luminary source.

9. A computing device program product for detecting a plurality of luminary fixtures in an indoor environment using an electronic image capture device and electronic computing device, the computing device program product comprising:
   a non-transitory computer readable medium;
   first programmatic instructions for capturing a ceiling scan of the indoor environment with at least the electronic image capture device;
   second programmatic instructions for analyzing a synthetic ceiling image of all rooms in the indoor environment corresponding with the ceiling scan using the electronic computing device to identify a plurality of luminary candidates, wherein the synthetic ceiling image represents a texture mapped model of a ceiling of the indoor environment by room; and
   third programmatic instructions for converting the plurality of luminary candidates to define the plurality of luminary fixtures, wherein the programmatic instructions are stored on the non-transitory computer readable medium, wherein the third programmatic instructions for converting the plurality of luminary candidates to define the plurality of luminary fixtures further comprises:
  measuring an area associated with a selection of the plurality of luminary candidates, wherein the area is measured in pixel units;
  converting the area into a metric area using a plurality of distance units provided by the point cloud;
  estimating a conversion factor between the metric area and a power consumption utilizing a selection of the plurality of luminary candidates, wherein the conversion factor is determined from a plurality of luminaries having a known area and a known power consumption using a linear least square method; and
  determining a power consumption for each of the plurality of luminary fixtures by multiplying the conversion factor with the area of each of the plurality of luminary candidates.

10. The computing device program product of claim 9, wherein the first programmatic instructions for capturing the ceiling scan further comprises:
  fourth programmatic instructions for moving the electronic image capture device through the indoor environment;
  fifth programmatic instructions for capturing the indoor environment;
  sixth programmatic instructions for generating a point cloud of the indoor environment;
  seventh programmatic instructions for colorizing the point cloud;
  eighth programmatic instructions for extracting the colored point cloud of a ceiling;
  ninth programmatic instructions for dividing the extracted point cloud into a plurality of rooms; and
  tenth programmatic instructions for generating the synthetic ceiling image for each of the plurality of rooms.

11. The computing device program product of claim 9, wherein the second programmatic instructions for analyzing the synthetic ceiling image further comprises:
  twelfth programmatic instructions for generating a binary image of the synthetic ceiling image;
  thirteenth programmatic instructions for detecting a plurality of blobs wherein connected white pixels are grouped together in each of the plurality of blobs; and
  fourteenth programmatic instructions for identifying the plurality of luminary candidates corresponding with the plurality of blobs.

12. The computing device program product of claim 11, further comprising fifteenth programmatic instructions for utilizing a threshold filter to generate the binary image of the synthetic ceiling image.

13. The computing device program product of claim 11, further comprising sixteenth programmatic instructions for utilizing a blob detection algorithm to detect the plurality of blobs, wherein the plurality of blobs correspond with the plurality of luminary candidates.

14. A system of computer hardware for detecting a plurality of luminary fixtures in an indoor environment, the system comprising:
  an electronic image capture device, wherein
    the electronic image capture device is configured to capture a ceiling scan of the indoor environment; and
  an electronic computing device, wherein
    the electronic computing device is configured to analyze a synthetic ceiling image of all rooms in the indoor environment corresponding with the ceiling scan to identify a plurality of luminary candidates, wherein the synthetic ceiling image represents a texture mapped model of a ceiling of the indoor environment by room, and wherein
    the electronic computing device is configured to convert the plurality of luminary candidates to define the plurality of luminary fixtures, wherein the converting the plurality of luminary candidates to define the plurality of luminary fixtures further comprises:
      measuring an area associated with a selection of the plurality of luminary candidates, wherein the area is measured in pixel units;
      converting the area into a metric area using a plurality of distance units provided by the point cloud;
      estimating a conversion factor between the metric area and a power consumption utilizing a selection of the plurality of luminary candidates, wherein the conversion factor is determined from a plurality of luminaries having a known area and a known power consumption using a linear least square method; and
      determining a power consumption for each of the plurality of luminary fixtures by multiplying the conversion factor with the area of each of the plurality of luminary candidates.

15. The system of claim 14, wherein the capturing the ceiling scan further comprises:
  moving the electronic image capture device through the indoor environment;
  capturing the indoor environment;
  generating a point cloud of the indoor environment;
  colorizing the point cloud;
  extracting the colored point cloud of a ceiling;
  dividing the extracted point cloud into a plurality of rooms; and
  generating the synthetic ceiling image for each of the plurality of rooms.

16. The system of claim 14, wherein analyzing the synthetic ceiling image further comprises:
  generating a binary image of the synthetic ceiling image;
  detecting a plurality of blobs wherein connected white pixels are grouped together in each of the plurality of blobs; and
  identifying the plurality of luminary candidates corresponding with the plurality of blobs.

* * * * *